(12) United States Patent
Bleahen

(10) Patent No.: US 9,443,068 B2
(45) Date of Patent: Sep. 13, 2016

(54) SYSTEM AND METHOD FOR PREVENTING UNAUTHORIZED ACCESS TO INFORMATION

(71) Applicant: Micheal Bleahen, Dublin (IE)

(72) Inventor: Micheal Bleahen, Dublin (IE)

( * ) Notice: Subject to any disclaimer, the term of this patent is extended or adjusted under 35 U.S.C. 154(b) by 19 days.

(21) Appl. No.: 13/949,356

(22) Filed: Jul. 24, 2013

(65) Prior Publication Data

US 2013/0311784 A1    Nov. 21, 2013

Related U.S. Application Data

(63) Continuation-in-part of application No. 12/390,049, filed on Feb. 20, 2009, now abandoned.

(60) Provisional application No. 61/030,003, filed on Feb. 20, 2008, provisional application No. 61/081,523, filed on Jul. 17, 2008, provisional application No. 61/153,062, filed on Feb. 17, 2009.

(51) Int. Cl.

| | | |
|---|---|---|
| *G06F 21/31* | (2013.01) | |
| *G06F 21/72* | (2013.01) | |
| *H04L 9/32* | (2006.01) | |
| *H04L 9/08* | (2006.01) | |
| *G06F 21/33* | (2013.01) | |

(52) U.S. Cl.
CPC .............. *G06F 21/31* (2013.01); *G06F 21/33* (2013.01); *G06F 21/72* (2013.01); *H04L 9/0825* (2013.01); *H04L 9/3231* (2013.01); *H04L 9/3234* (2013.01); *H04L 9/3263* (2013.01); *H04L 2209/127* (2013.01); *H04L 2209/56* (2013.01); *H04L 2209/80* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,225,664 | A | * 7/1993 | Iijima | G06F 21/34 235/380 |
| 5,396,558 | A | * 3/1995 | Ishiguro | G06Q 20/341 380/30 |
| 5,615,343 | A | 3/1997 | Sarangdhar et al. | |
| 5,701,343 | A | * 12/1997 | Takashima | G06F 21/10 380/279 |
| 5,770,844 | A | 6/1998 | Henn | |
| 5,799,085 | A | * 8/1998 | Shona | G06Q 20/341 235/379 |
| 6,134,431 | A | * 10/2000 | Matsumoto | H04W 84/16 380/247 |
| 6,185,662 | B1 | 2/2001 | Beyerlein et al. | |
| 6,266,690 | B1 | 7/2001 | Shankarappa et al. | |
| 6,526,509 | B1 | * 2/2003 | Horn | H04L 9/3263 380/277 |
| 6,829,723 | B1 | 12/2004 | Bae | |
| 7,051,200 | B1 | 5/2006 | Manferdelli et al. | |

(Continued)

*Primary Examiner* — Peter Poltorak
(74) *Attorney, Agent, or Firm* — Seyfarth Shaw LLP; Brian Michaelis

(57) ABSTRACT

An authentication system protects a hardware cryptographic chip from being commanded to decrypt or sign data by someone other than the legitimate owner(s) of the certificate residing on the chip. Openness of present cryptographic hardware systems are limited by imposing a condition that the cryptographic chip will only perform critical cryptographic tasks if the task is accompanied by a signature which only the legitimate owner can provide.

10 Claims, 12 Drawing Sheets

(56) References Cited

U.S. PATENT DOCUMENTS

| | | | |
|---|---|---|---|
| 7,552,467 B2* | 6/2009 | Lindsay | G06F 21/31 713/165 |
| 7,783,884 B2* | 8/2010 | Nakano | H04L 63/0442 713/175 |
| 7,958,544 B2* | 6/2011 | Chen | H04L 63/08 713/183 |
| 8,522,349 B2* | 8/2013 | Crume | H04L 63/1441 705/51 |
| 8,726,024 B2* | 5/2014 | Nagai | H04L 9/3273 713/169 |
| 8,769,784 B2* | 7/2014 | Ganesan | G06F 21/31 26/4 |
| 2002/0013772 A1 | 1/2002 | Peinado | |
| 2002/0095588 A1* | 7/2002 | Shigematsu | G06Q 20/367 713/186 |
| 2002/0152387 A1 | 10/2002 | Asano | |
| 2002/0178370 A1* | 11/2002 | Gurevich | G06F 21/34 713/189 |
| 2002/0198848 A1* | 12/2002 | Michener | G06Q 20/04 705/75 |
| 2003/0046542 A1* | 3/2003 | Chen | G06F 21/445 713/176 |
| 2003/0065930 A1* | 4/2003 | Fukushima | G06F 21/85 713/189 |
| 2003/0167207 A1* | 9/2003 | Berardi | G06Q 10/025 705/16 |
| 2003/0204732 A1* | 10/2003 | Audebert | H04L 63/0846 713/182 |
| 2003/0212894 A1* | 11/2003 | Buck | G06F 21/34 713/184 |
| 2004/0039919 A1* | 2/2004 | Takayama | G06Q 20/04 713/180 |
| 2004/0059685 A1* | 3/2004 | Sakamura | G06Q 10/02 705/65 |
| 2004/0098585 A1* | 5/2004 | Grove | G06F 21/31 713/168 |
| 2004/0177215 A1* | 9/2004 | Nagamasa et al. | 711/103 |
| 2004/0202327 A1 | 10/2004 | Little et al. | |
| 2005/0015588 A1* | 1/2005 | Lin | G06F 21/34 713/159 |
| 2005/0144634 A1* | 6/2005 | Koo | H04N 7/1675 725/31 |
| 2005/0256806 A1* | 11/2005 | Tien | G06Q 20/04 705/64 |
| 2006/0015748 A1* | 1/2006 | Goto | G06F 21/52 713/190 |
| 2006/0080732 A1* | 4/2006 | Ohkubo | G06F 21/606 726/9 |
| 2006/0095388 A1* | 5/2006 | Brown | G06Q 20/0855 705/67 |
| 2006/0129818 A1* | 6/2006 | Kim | H04L 63/0442 713/171 |
| 2006/0212394 A1* | 9/2006 | Terada | G06Q 20/105 705/41 |
| 2006/0242423 A1* | 10/2006 | Kussmaul | G06F 21/32 713/182 |
| 2006/0280300 A1* | 12/2006 | Rossini | H04L 9/0841 380/44 |
| 2006/0288405 A1* | 12/2006 | Albisu | G06F 21/34 726/8 |
| 2007/0021141 A1* | 1/2007 | Yokota | G06F 21/10 455/550.1 |
| 2007/0033136 A1* | 2/2007 | Hu | G06Q 20/10 705/39 |
| 2007/0091345 A1* | 4/2007 | Qiu et al. | 358/1.14 |
| 2007/0220261 A1 | 9/2007 | Farrugia et al. | |
| 2008/0114982 A1* | 5/2008 | Bleumer | G07B 17/00733 713/171 |
| 2008/0212771 A1* | 9/2008 | Hauser | G06F 21/305 380/44 |
| 2008/0295180 A1* | 11/2008 | Yoneda | G06F 21/33 726/27 |
| 2009/0033485 A1* | 2/2009 | Naeve | H04W 8/005 340/539.23 |
| 2009/0064294 A1* | 3/2009 | Cook | G06F 21/34 726/6 |
| 2009/0136042 A1* | 5/2009 | Veillette | H04L 63/10 380/279 |
| 2009/0235083 A1* | 9/2009 | Bleahen | 713/178 |
| 2010/0262832 A1* | 10/2010 | Tie | H04L 9/3247 713/176 |
| 2011/0053558 A1* | 3/2011 | Teague | H04L 9/3273 455/411 |
| 2011/0258452 A1* | 10/2011 | Coulier | G06F 21/31 713/171 |

* cited by examiner

SYSTEM AND METHOD FOR PREVENTING UNAUTHORIZED ACCESS TO INFORMATION

CROSS REFERENCE TO RELATED APPLICATIONS

The present disclosure is a Continuation-In-Part (CIP) application of U.S. Non-provisional application Ser. No. 12/390,049 filed on Feb. 20, 2009, which claims priority to U.S. Provisional Patent Application 61/030,003 filed on Feb. 20, 2008, U.S. Provisional Patent Application 61/081,523 filed on Jul. 17, 2008, and U.S. Provisional Patent Application 61/153,062 filed on Feb. 17, 2009, all of which are incorporated by reference in their entirety.

FIELD

The present disclosure relates to computer security, and more particularly to systems and methods for user authentication.

BACKGROUND

Hardware cryptography has a weakness in that a cryptographic chip (also referred to as a CryptoChip) will perform critical cryptographic tasks as long as the task is accompanied by a password of a certificate residing on the chip.

The problem is that a hacker or virus/trojan having a key logger can trap a users' key strokes, grabbing the user's password allowing the hacker or virus trojan, unseen by the user, to command the chip to decrypt and/or sign data.

The problem, as stated above, is that the cryptographic chip is open to an application, including a nefarious one, that can supply the password. It's important in hardware cryptography that the system be open, placing as few restrictions on legitimate users as possible. However in its present state, hardware cryptography is too open.

Hardware cryptography uses two cryptographic libraries, PKCS #11 and the CryptoAPI. These cryptographic libraries allow developers of hardware cryptographic solutions to rapidly develop applications without needing to know anything about the underlying hardware. Additionally, these two libraries are almost a standard in cryptography and as such there is enormous resistance to any changes to these libraries.

These libraries are also used by a CryptoChip and have a weakness called Silent-Mode Login, which allows an application to supply the password to the CryptoChip or Smart Card.

The problem with Silent-Mode Login is that a trojan application having a key logger can trap a users' key strokes, grabbing the user's password and allowing the hacker or virus trojan, unseen by the user, to command the Smart Card or CryptoChip to decrypt and/or sign data and at some future time send that data from the computer.

The inherent weakness of Silent-Mode Login is known to the Smart Card industry but is regarded as an acceptable risk because in the absence of Silent-Mode Login, the user would be required to frequently supply the password for critical tasks such as decryption & message signing, leading to user irritation and a rejection of Smart Card technology.

A properly working PKI system depends on a user's private key remaining private. While Smart Cards make it impossible to steal a user's private key, the weakness of Silent-Mode Login means that while it may not be possible to steal a private key, it is possible to utilize a private key, thus undermining confidence in such a system.

SUMMARY

The present disclosure provides a system and method for protecting a hardware cryptographic chip from being commanded to decrypt or sign data by someone other than the legitimate owner(s) of the certificate residing on the chip. Illustrative embodiments of the present disclosure limit the openness of present cryptographic hardware systems by imposing a condition that the cryptographic chip will only perform critical cryptographic tasks if the task is accompanied by a signed time-stamped transactionID, which only the legitimate owner of the chip can provide, instead of the password used today.

An illustrative embodiment of the disclosure provides a method of securing data storage hardware. The method includes the steps of obtaining a time-stamped transactionID from a cryptographic device, sending the time-stamped transactionID to the data storage hardware and obtaining therefrom a time-stamped transactionID signature. The method further includes the steps of providing access to the data storage hardware, sending the time-stamped transactionID signature with data to the cryptographic device, the cryptographic device creating a second time-stamped transactionID as a function of an identifier of the cryptographic device, and comparing the time-stamped transactionID from the cryptographic device with the second time-stamped transactionID. If the time-stamped transactionID from the cryptographic device matches the second time-stamped transactionID, then cryptographic service is provided on the data.

Another illustrative embodiment of the disclosure provides a method of securely logging-on to a computer or data storage hardware. The method includes the steps of generating a keypair by an eKey and sending a public key of the keypair to a computer via a wireless communication, for example, using Bluetooth, microwave, infrared, satellite, or other type of wireless communication. The method further includes a computer application generating an application keypair, comprising an application public key and an application private key, and sending the application public key to the eKey, generating a Random Number (RN) that the eKey displays, encrypting the RN with the application public key, and returning the encrypted RN to the computer application. Furthermore, the method includes decrypting the RN with the application private key.

A further illustrative embodiment of the disclosure provides a method of securing data. The method includes an eKey generating a public and private keypair, sending the public key to a computer via a wireless communication, storing the public key within an account on a cryptographic chip on the computer, and storing the private key on a cryptographic chip within the eKey. The method also includes applying a fingerprint to a fingerprint analyser of the eKey.

BRIEF DESCRIPTION OF THE DRAWINGS

The foregoing and other features and advantages of the present disclosure will be more fully understood from the following detailed description of illustrative embodiments, taken in conjunction with the accompanying drawings in which.

DETAILED DESCRIPTION

Figure 1:
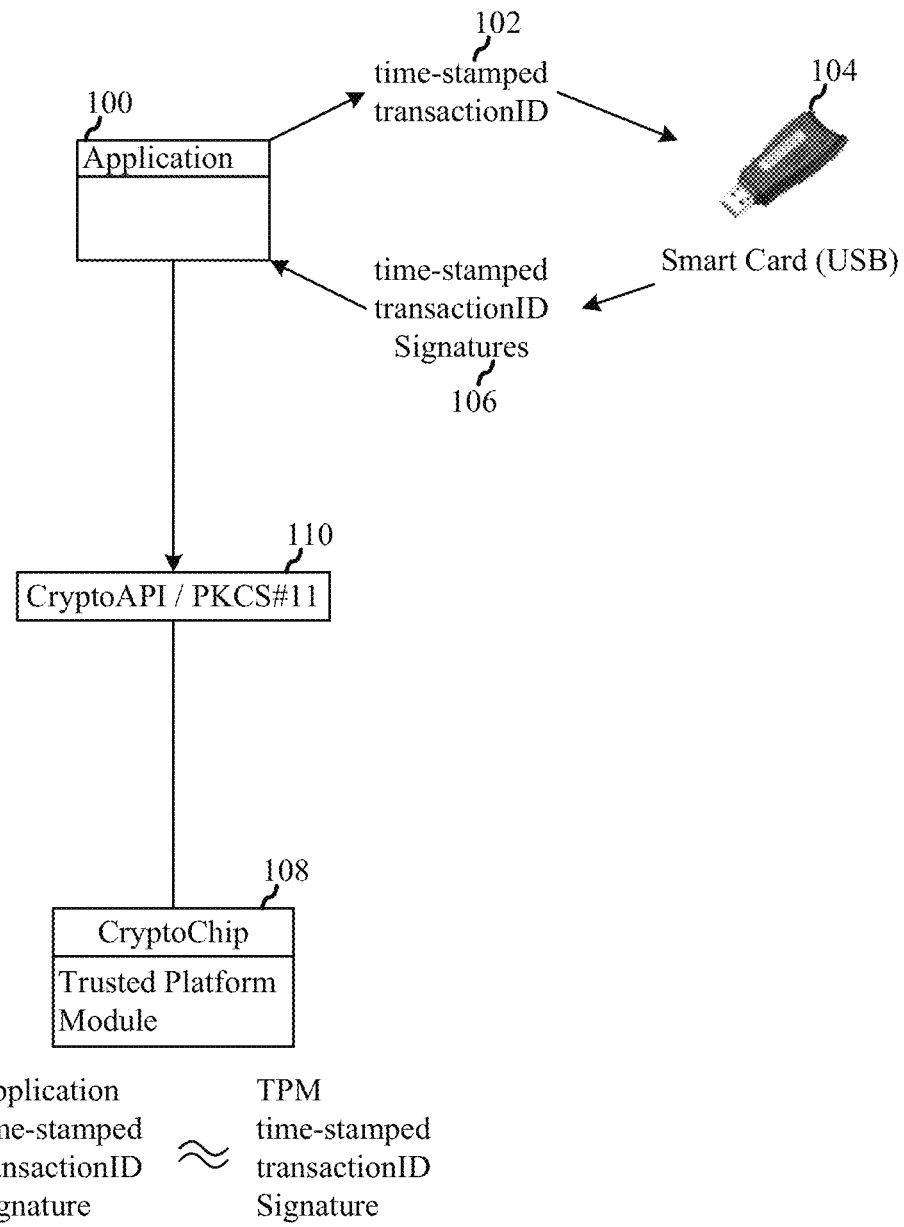
FIG. 1 is a system diagram of an authentication system and process according to an illustrative embodiment of the disclosure.

Detailed embodiments of devices, systems, and methods are disclosed herein, however, it is to be understood that the disclosed embodiments are merely exemplary of the devices, systems, and methods, which may be embodied in various forms. Therefore, specific functional details disclosed herein are not to be interpreted as limiting, but merely as a basis for the claims and as a representative basis for teaching one skilled in the art to variously employ the present disclosure.

Illustrative embodiments of the disclosure exclude unauthorized execution of a CryptoChip by demanding that cryptographic requests be accompanied by a signature of a time-stamped transactionID. Furthermore, the illustrative embodiments require that the signature be provided by a Smart Card or eKey having a copy of a public/private keypair from the CryptoChip in which only a PKCS #11 library has been implemented and on which silent-mode login is switched off. A CryptoChip functioning as described herein may be, for example, IBM's PCIe Cryptographic Coprocessor CEX3C/4765 or PCI-X Cryptographic Coprocessor PCIXCC, or the like.

A Smart Card, as generally known in the art may include a male connection terminal, mass storage controller, test points, flash memory chip, crystal oscillator, and a cryptographic chip. Similarly, an eKey, as generally known in the art may include a wireless communication transmitter/receiver, a video display, and a cryptographic chip.

By requiring a Smart Card or eKey with a copy of the CryptoChip public/private keypair, this embodiment enables the production of a signature that will be a copy of the signature produced by the CryptoChip and, more importantly, excludes processes which cannot provide that signature. By requiring that the PKCS #11 library be implemented, because the PKCS #11 is session-based, an application only has to authenticate at the beginning of a session and, unlike a CryptoAPI, does not have to re-authenticate. Furthermore, by requiring silent-mode login be switched off, the Smart Card will not begin a cryptographic session unless a user clicks "OK"' or provides a password. This user interaction is something impossible for a hacker or a virus/trojan to perform.

The use of a Smart Card is the $1^{st}$ factor of authentication. In addition, the user interaction required by the illustrative embodiments of the invention, which cannot be simulated by a hacker or virus/Trojan, is the $2^{nd}$ factor of authentication.

When the CryptoChip is initialized, a CryptoChip Certificate is created. Each user of the CryptoChip is issued a certificate containing the public/private keypair from the CryptoChip Certificate and individualized Distinguished Name details. These user certificates are stored on a Smart Card having implemented the PKCS #11 and having silent-mode login disabled. The Smart Card allows data to be signed with a signature to be the same as a signature created by the CryptoChip. This allows for the maintenance of distinct accounts on the CryptoChip and a method of authenticating each request to the CryptoChip.

An illustrative authentication method according to an embodiment of the present disclosure is described with reference to FIG. 1. When an application 100 needs a cryptographic service, the application 100 first obtains a time-stamped transactionID 102 from a CryptoChip 108. The application 100 then sends a time-stamped transactionID 102 to a Smart Card 104 where the time-stamped transactionID 102 is signed to produce a time-stamped transactionID signature 106. If this is the first time the application 100 has used the Smart Card 104, then the Smart Card 104 requires the user to authorize the session by clicking "OK" or entering a password because, for example, silent-mode login has been disabled on the Smart Card 104 and only the PKCS #11 110 has been implemented on the Smart Card 104. The application 100 then sends the time-stamped transactionID signature 106 with the data to the CryptoChip 108. The CryptoChip 108 takes the time-stamped transactionID 102, which it produced earlier for the application 100, and signs the time-stamped transactionID 102 with the CryptoChip certificate. The CryptoChip 108 compares the two signatures and if they are equal the cryptographic service is performed.

In another embodiment of the disclosure, a trojan threat to CryptoChips can be nullified by using a Smart Card which provides a second factor of authentication and a signed synchronised dynamic transactionID. In this embodiment, the CryptoChip only executes commands when the command is accompanied by a transactionID signature, thus avoiding impersonation, where the signature is provided by the Smart Card. Each user of the CryptoChip is issued a certificate containing the public/private keypair from the CryptoChip Certificate and individualized Distinguished Name details. This allows the maintenance of distinct accounts on the CryptoChip. New users can only be created by an existing user and a newly created user certificate is stored on a Smart Card, only implementing the PKCS #11 library, thus benefiting from sessions, and on which Silent-Mode Login has been disabled.

Embodiments of the disclosure use a set of synchronized Random Number Generators (RNG's) or other synchronizable function(s) between the CryptoChip on the one hand and a Crypto Com Object (CCO) on the other. A Seed and a Counter are passed from the CryptoChip to the CCO when the computer is started-up and both are used to initialize synchronized RNG's on the CryptoChip and the CCO. This allows the creation of synchronised transactionIDs. The Smart Card signs the transactionID. This signed transactionID is passed by the application to the CryptoChip through the CryptoAPI. The CryptoChip transactionID is signed and the signed transactionID is compared to the signed transactionID accompanying a cryptographic command. Only commands satisfying this signature comparison are executed. This tightly limits access to the CryptoChip to Smart Cards holding a clone of the Crypto Certificate.

Two important aspects of the above embodiments which protect against an attack by a trojan/virus or a hacker are, first, only implementing the PKCS #11 library on the Smart Card on which Silent-Mode Login has been disabled, and second, signing the transactionID.

The first important aspect, only implementing the PKCS #11 library on the Smart Card on which Silent-Mode Login has been disabled, is effective because the PKCS #11 library, unlike the CryptoAPI, is session based. As such, applications needing to utilize the Smart Card only have to pass the password of the Smart Card once. With Silent-Mode Login disabled, the user is required to interact before allowing the session to begin. This puts the user totally in control of sessions which start on the Smart Card. More than one application can use the Smart Card, but each application requires the user to interact once before the session will begin. This is something a trojan/virus or hacker cannot do.

The second important aspect, signing the transactionID before commands will execute on the CryptoChip, is effective because the Smart Card must be used, but only sessions interacted once by the user are started on the Smart Card. This is also something a trojan/virus or hacker cannot do.

Figure 2:
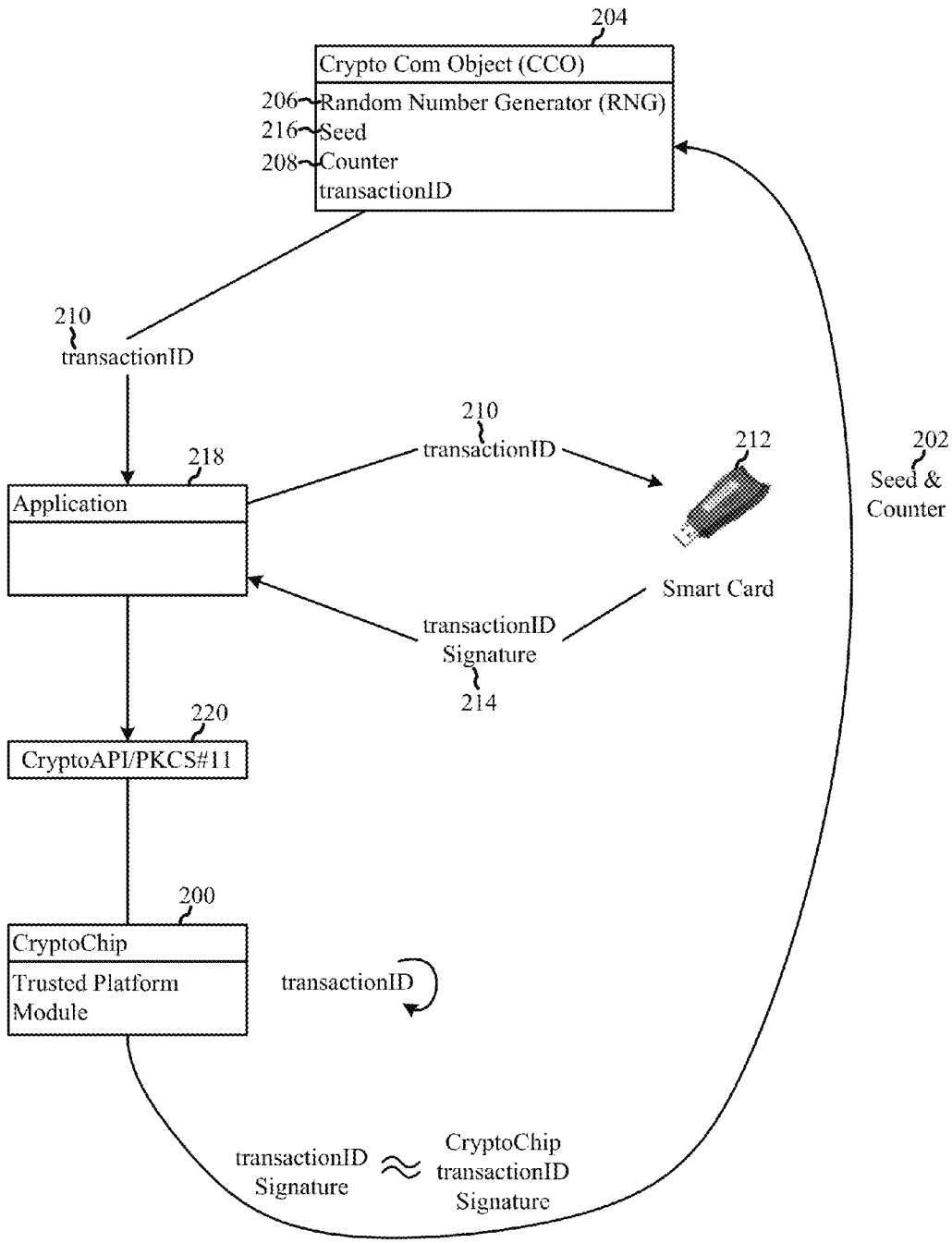
FIG. 2 is a system diagram of an authentication system and process according to an illustrative embodiment of the disclosure.

Another illustrative embodiment of the disclosure is described with reference to the process of FIG. 2. When a computer is switched on, a CryptoChip 200 sends Seed and Counter 202 values to a Crypto Com Object (CCO) 204. An object of this embodiment is to synchronize a Random Number Generator (RNG) 206 of the CCO 204 with a RNG, which is not shown, of the CryptoChip 200. This is achieved by seeding the RNG 206 of the CCO 204 and the RNG of the CryptoChip 200 with a Seed 216 and cycling them Counter 208 times. The output from the CCO's 204 RNG 206 is a dynamic transactionID 210 which should now be synchronized with the RNG of the CryptoChip 200, except being 1 cycle ahead. The dynamic transactionID 210 is sent to a Smart Card 212 where it is signed. This signed transactionID 214 is passed from the application 218, through the 'PKCS #11/CryptoAPI' libraries 220, to the CryptoChip 200. The CryptoChip 200 only executes commands when the command is accompanied by a transactionID signature, thus avoiding impersonation.

The CryptoChip 200 cycles its RNG once to produce the CryptoChip transactionID. The CryptoChip 200 signs the CryptoChip transactionID with the CryptoChip certificate before it compares the signature to the signature of the CCO transactionID. If they are identical the operation is processed and the data is decrypted/signed.

If a transactionID Number is coupled with the signed transactionID, asynchronous execution may be possible. The CCO would have to guard against Remote Desktop and virtual execution.

Another embodiment of the disclosure uses a set of synchronized Random Number Generators (RNG's) between the CryptoChip on the one hand and the Crypto Com Object (CCO) on the other. When the CryptoChip is first used a CryptoChip Certificate is created and stored on the CryptoChip. The CryptoChip's RNG is seeded and cycled Counter times. Finally the Seed and Counter are encrypted using the CryptoChip Certificate and passed to the CCO after initialization or when the computer is started-up.

Each user of the CryptoChip is issued a certificate containing the public/private keypair from the CryptoChip Certificate and individualized Distinguished Name details. This allows all users to access an eSeed & eCounter and yet maintain distinct accounts on the CryptoChip. New users can only be created by an existing user and a newly created user certificate is stored on a Smart Card, having the PKCS #11 library, and on which Silent-Mode Login has been disabled. When the computer is switched on, the CCO is started. If the CryptoChip has been initialized, then the CryptoChip passes the eSeed, the eCounter, and the public key of the computer certificate to the CCO.

Figure 3:
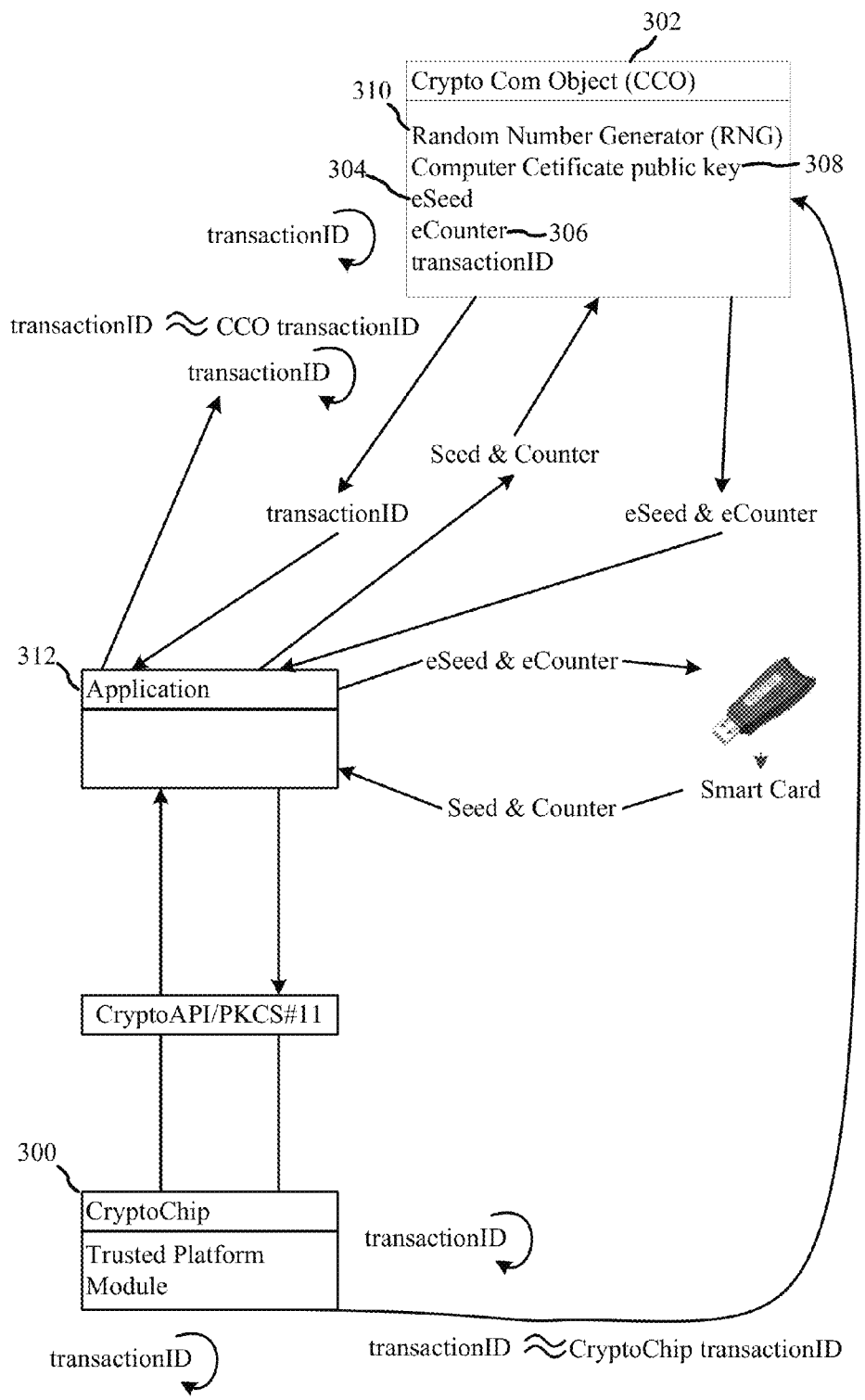
FIG. 3 is a system diagram of an authentication system and process according to an illustrative embodiment of the disclosure.

An illustrative process according to this embodiment is described with reference to FIG. 3. When a computer is switched on, a CryptoChip 300 sends an eSeed 304, an eCounter 306 and a Computer Certificate public key 308 to a Crypto Com Object (CCO) 302. An object of this step is to synchronize a Random Number Generator (RNG) 310 of the CCO 302 with a RNG, which is not shown, of the CryptoChip 300. This is achieved by seeding the RNG 310 of the CCO 302 with the decrypted eSeed 304 and cycling the RNG 310 Counter times. The eSeed 304 and eCounter 306 are made publicly available to applications needing to utilize the CryptoChip 300. Because the Counter increases in defined steps, i.e., it increases by 2 every time the CryptoChip 300 performs a private key operation, the Counter can be used to crack the private key of the Computer Certificate. For this reason, the eCounter 306 is not directly available to applications needing to utilize the CryptoChip 300. Instead, the eCounter 306 is only made available to a computer application which returns a signature of the eSeed 304 to the CCO 302. On receipt of the signature of the eSeed 304, the CCO 302 attempts to verify the signature with the public key of the Computer Certificate and if it verifies the signature, then the CCO 302 releases the eCounter 306 to the computer application 312. The CCO 302 is locked and subsequent calls are queued.

Figure 4:
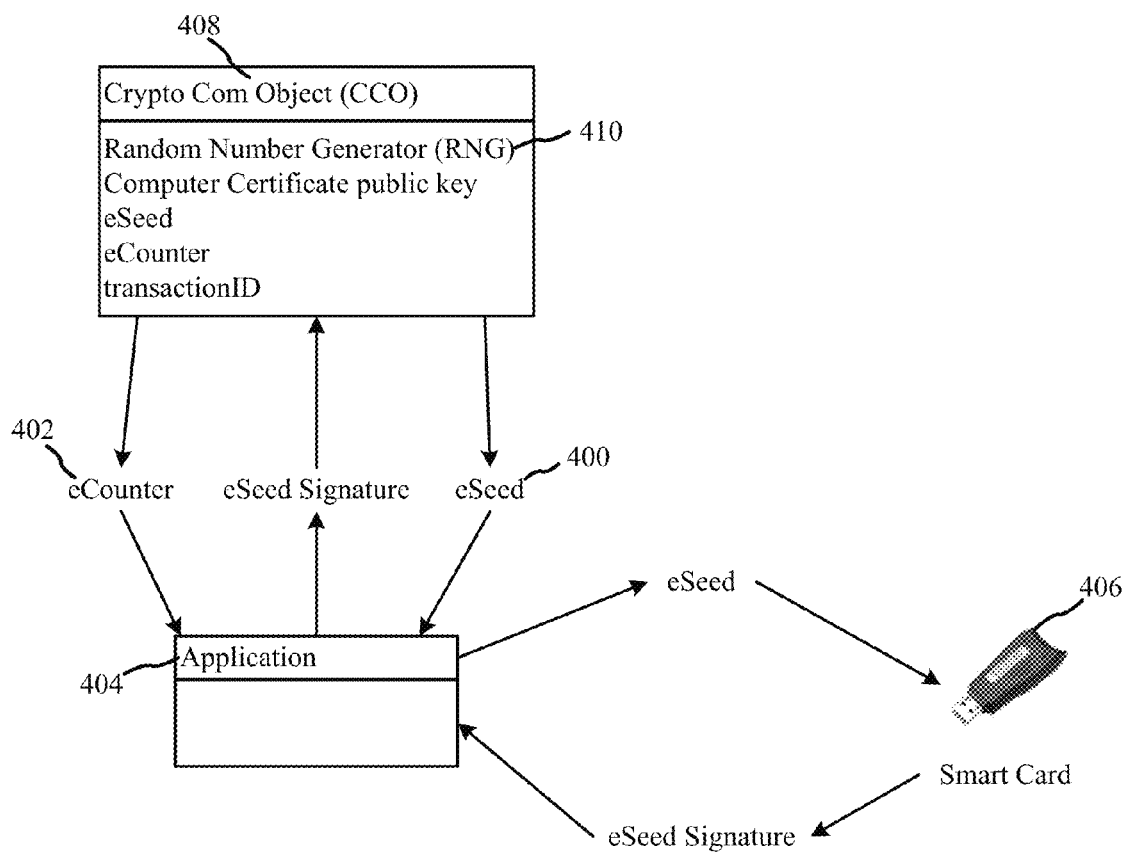
FIG. 4 is a system diagram of an authentication system and process according to an illustrative embodiment of the disclosure.

Referring to FIG. 4, once the eSeed 400 and eCounter 402 have been acquired by the application 404, they are sent by the application 404 to the Smart Card 406 where they are decrypted. The certificate on the Smart Card 406 shares the same public/private key pair as the computer certificate on the CryptoChip. First, the decrypted seed and counter are returned to the application 404. The seed and counter are then sent from the application 404 to the CCO 408 where the seed is used to seed the CCO's Random Number Generator (RNG) 410. The RNG 410 is cycled Counter+1 times. The output from the CCO's RNG 410 is a dynamic transactionID which should now be synchronized with the RNG on the CryptoChip, except being 1 cycle ahead. The dynamic transactionID is passed from the application 404, through the PKCS #11/CryptoAPI libraries, to the CryptoChip. The CryptoChip cycles its RNG once before it compares the transactionID to the CryptoChip transactionID. If the transactionID is identical to the CryptoChip transaction ID, the operation is processed wherein the data is decrypted/signed. The CryptoChip RNG is cycled one more time and the new transactionID is passed back to application 404.

The CryptoChip updates the eCounter in the CCO, by adding 2 to the previous Counter value before encrypting it. A signature of the eSeed must accompany the new eCounter. Only when the signature of the eSeed is verified by the CCO is the new value of the eCounter accepted. This process of signing the eSeed prevents rogue applications from overwriting the eCounter with bad values that would put the system out of synch. After the CCO's eCounter is overwritten, the CCO is unlocked. Other applications can request the eSeed and eCounter as above in order to get the CryptoChip to perform private key tasks. The new transactionID is passed back to the application where it may be passed to the CCO if further private key tasks are required.

Assuming the next private key task originates from the same application, the application passes the new transactionID to the CCO. The CCO cycles its RNG once and compares the result to the received transactionID. If they are identical, the CCO cycles its RNG once more to produce a new transactionID which is passed back to the application. The application passes this new transactionID through the 'PKCS #11/CryptoAPI' libraries to the CryptoChip with the next private key task. The transactionID, whether it is the one on the CryptoChip or the CCO, is a private variable against which only comparisons are possible.

Another illustrative embodiment of the disclosure uses a set of synchronized Random Number Generators (RNGs) between the CryptoChip on the one hand and the CCO on the other. When the CryptoChip is first used a CryptoChip Certificate is created and stored on the CryptoChip. The CryptoChip RNG is seeded and cycled Counter times. Finally the Seed and Counter are encrypted using the CryptoChip Certificate and stored on the computer in a file called Crypto.tID. Each user of the CryptoChip is issued a certificate containing the public/private keypair from the CryptoChip Certificate and individualized Distinguished Name details. This allows all users to access the Crypto.tID and yet maintain distinct accounts on the CryptoChip. New users can only be created by an existing user and a newly created user certificate is stored on a Smart Card, having the PKCS #11 library, and on which Silent-Mode Login has been disabled.

Figure 5:
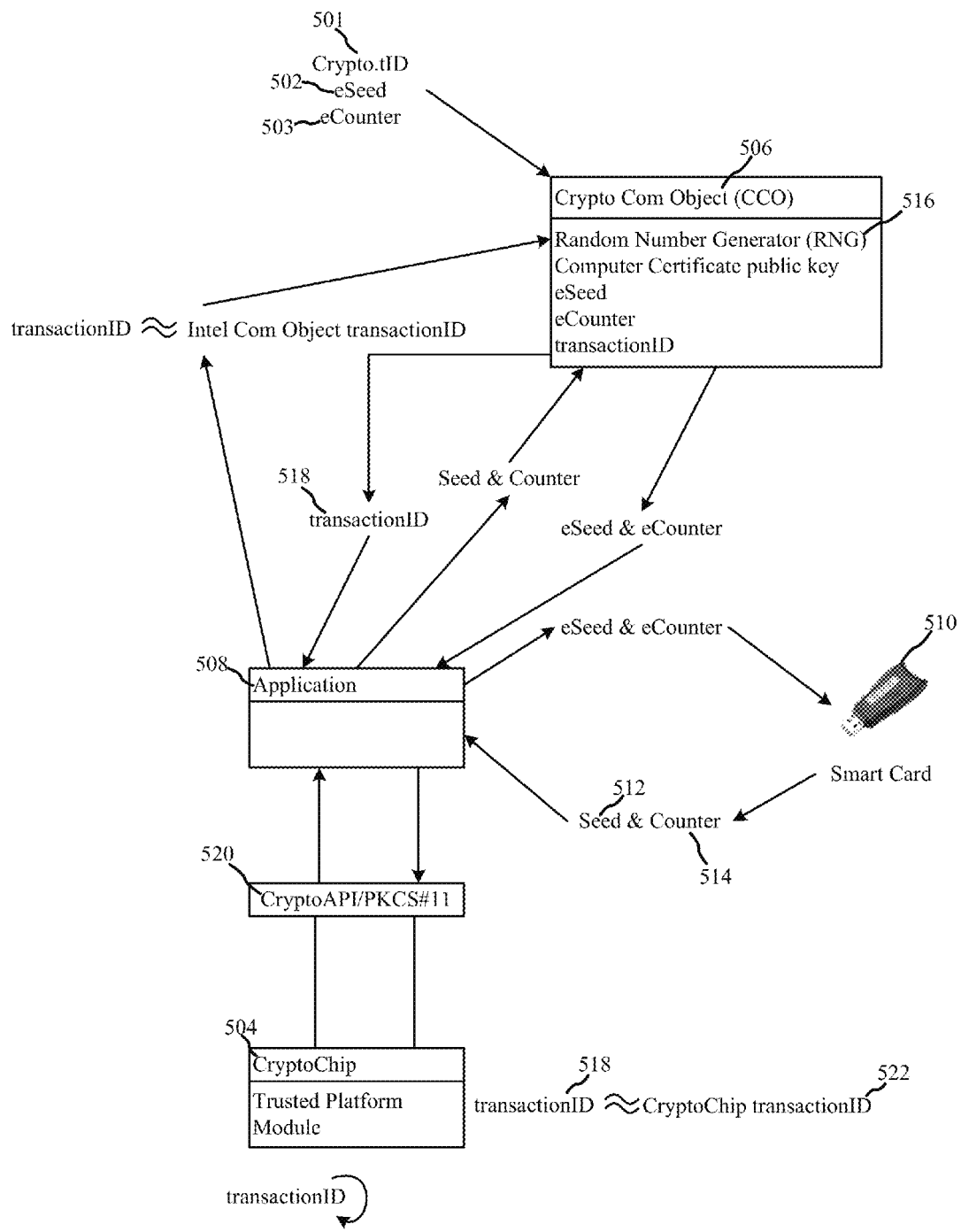
FIG. 5 is a system diagram of an authentication system and process according to an illustrative embodiment of the disclosure.

A process according to this illustrative embodiment is described with reference to FIG. 5. When the computer is switched on, a CryptoChip Com Object (CCO) 506 is started. If a CryptoChip 504 has been initialized, then the CCO 506 loads a Crypto.tID 501, parses out an eSeed 502 and an eCounter 503, and makes them available for applications desiring to utilize the CryptoChip 504. The Crypto.tID 501 is loaded from a predefined location. The CCO 506 parses the crypto.tID 501 and obtains the eSeed 502 and eCounter 503. These are made publicly available to applications needing the CryptoChip 504 functionality.

A computer application 508, desiring to utilize the CryptoChip 504, makes a request to the CCO 506 and obtains the eSeed 502 and eCounter 503. The CCO 506 is locked and subsequent calls are queued. The eSeed 502 and eCounter 503 are decrypted using the user's Smart Card 510. The seed 512 and counter 514 are sent from computer application 508 to the CCO 506 where the seed 512 is used to seed the CCO's Random Number Generator (RNG) 516. The RNG 516 is cycled Counter 514 times. The output from the RNG 516 is a dynamic transactionID which should now be synchronized with the RNG, which is not shown, of the CryptoChip 504.

The transactionID 518 is passed from the application 508, through the PKCS #11/CryptoAPI libraries 520, to the CryptoChip 504. The CryptoChip 504 compares the transactionID 518 to a CryptoChip transactionID 522. If they are identical, the operation is processed, the CryptoChip RNG is cycled once and a new transactionID is passed back to application 508. The application 508 increments the Counter 514 by one and encrypts the Counter to produce an eCounter that it passes to the CCO 506 together with the new transactionID. The CCO 506 cycles the RNG 516 once and compares the result to the transactionID received from the application 508. If they are identical, the CCO 506 overwrites the eCounter and releases the lock for the next queued request.

If the next queued request is coming from the same application as the previous request, the application will know the current transactionID and place the CCO 506 in a locked-state by sending the current transactionID after which the steps above can be repeated and including the step of passing the transaction ID 518 through the PKCS #11/CryptoAPI libraries 520 to the CryptoChip 504. If the next queued request is coming from a different application, then the process begins from step 1. The transactionID, whether it is the one on the CryptoChip 504 or the CCO 506, is a private variable against which only comparisons are possible.

In another embodiment, instead of cryptographic tasks being accompanied by a password, the cryptographic task is accompanied by a signed time-stamped transactionID. This signed time-stamped transactionID is acquired by a separate call to the cryptographic chip prior to the request to perform a cryptographic task. This means that the previously open system is now only open to users who can provide the necessary signature and is closed to those who cannot provide a signed time-stamped transactionID. This embodiment is described with reference to the design shown in FIG. 6

In this embodiment, a public/private keypair on a Smart Card's 600 certificate must be a copy of a public/private keypair on a cryptographic chip's 604 certificate. Other certificate details, for example, name, address, etc, can be different, thus allowing for distinct accounts to be maintained. In this embodiment, only a PKCS #11 library 602 has been implemented on the Smart Card 600 and Silent mode login has been disabled. Further, the Smart Card 600 only interacts with the supplied PKCS #11 library 602 and rejects calls made by other copies of the PKCS #11 library.

Requiring a Smart Card 600 with a copy of the CryptoChip 604 public/private keypair enables production of a signature which will be a copy of the signature produced by the CryptoChip 604 and, more importantly, excludes processes which cannot provide that signature. Additionally the certificate who's public/private keypair is shared between the Smart Card 600 and the CryptoChip 604 is separate from the user's real certificate also residing on the CryptoChip 604. Since the PKCS #11 602 is session-based, an application only has to authenticate at the beginning of a session and, unlike the CryptoAPI, it does not have to re-authenticate.

With silent-mode login switched off, the Smart Card 600 will not begin a cryptographic session unless the user clicks "OK" or provides a password. This user interaction is something which a hacker or a virus/trojan cannot do. By requiring that the Smart Card 600 only interact with the supplied PKCS #11 library 602, the enforced user interaction arising from silent mode login being switched off can be circumvented if the PKCS #11 dynamically linked library (dll) can be replaced by another PKCS #11 dll on which silent mode login is switched on. This circumvention can be avoided by hardening the link between the PKCS #11 dll and the Smart Card 600.

Hardening the link between the PKCS #11 dll and the Smart Card involves configuring the Smart Card to work with a specific dll. If another dll is used, then the Smart Card will not execute. This can be achieved by inserting a requirement between Loading the Library:

HINSTANCE hPkcs11Lib=LoadLibrary(pkcs11_path);
And logging-in to the chip:
pFncList→C_Login (hSes, CKU_USER, (CK_CHAR_PTR)Pwd, strlen(Pwd)))

After the application has loaded the Smart Card dll, the application creates a hash of the loaded dll. This hash is passed to the Smart Card where it is compared to the hash of the dll, stored on the chip. If the hash doesn't compare, the user is not allowed to login.

Figure 7:
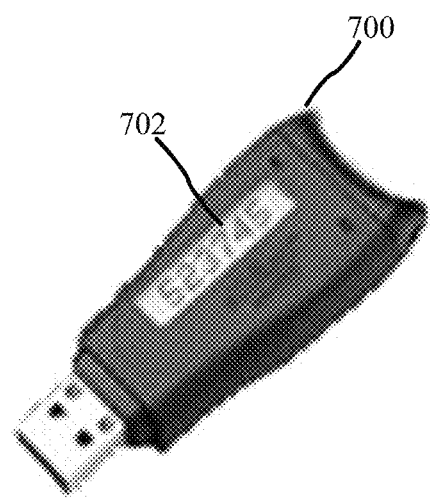
FIG. 7 is a pictorial view of a smart card having a display window as used in an illustrative embodiment of the disclosure.

A problem with the above scenario is that a rogue application could load any dll which works with the Smart Card and send the expected hash to the Smart Card. Referring to FIG. 7, a secure link can be achieved between the dll and a Smart Card 700 if the Smart Card 700 has a visual output screen 702 showing, for example, 4-6 digits. The digits on the visual output screen 702 can be concatenated to the binary of the dll. A hash of both can be calculated before being sent to the Smart Card 700. Each 4-6 digit combination produces a different hash. The Smart Card 700 would similarly concatenate the output on its screen with the binary of the dll, i.e., the binary of the dll is stored on the Smart Card 700, before calculating a hash of the combination. This hash is compared to the hash sent by the authenticating application. Authentication will only be complete if the hashes compare. A hacker or virus/trojan cannot circumvent this authentication method because the hacker or virus/trojan has no way of reading the digits on the visual output screen 702 of the Smart Card 700. These digits do not pass through the computer and therefore they are inaccessible to a hacker or virus/Trojan.

Figure 6:
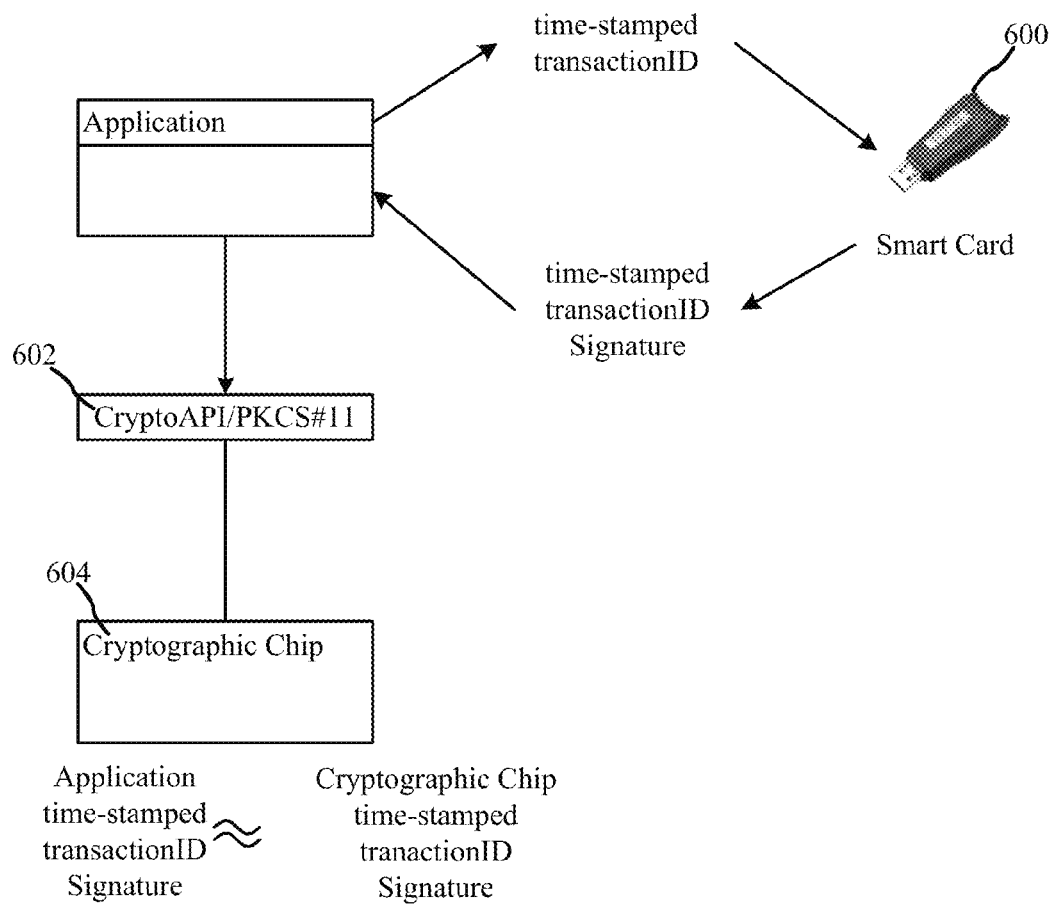
FIG. 6 is a system diagram of an authentication system and process according to an illustrative embodiment of the disclosure.

The embodiments described herein, with reference to FIG. 6 and FIG. 7 have two kinds of certificates:
Normal Certificates:
  These are certificates may be used to communicate securely online with a Bank or Inland Revenue and which are stored on the TPM of one or more computers.
Accessor Certificates:
  Accessor certificates are stored on the Smart Card and are used to restrict access to 'Normal Certificates'. Accessor Certificates protect the Normal Certificates.

The following four processes according to various illustrative embodiments of the disclosure are described below in more detail.

Authentication; Decryption/Signing; Exporting an Accessor Certificate to the USB Smart Card; and Exporting a Normal Certificate to a USB Memory Stick Authentication Process
  Authentication is a two-step process, including:
  The computer application authenticating with the USB Smart Card
  The USB Smart Card authenticating with the TPM
  Importantly, to the user it appears as a single step.

1. In the application wishing to authenticate, the user selects the Smart Card or eKey, for example, a USB Smart Card, containing the Accessor Certificate for the computer from a list of available Smart Cards/eKeys.
2. The user selects the Accessor Certificate from the USB Smart Card.
3. The user enters two passwords:
   a. A static password, which the user remembers and which blocks those with physical access to the Smart Card; and
   b. A dynamic transactionID which the user reads from the visual display unit
   (VDU) of the USB Smart Card, which is inaccessible to hackers or virus/trojan.
4. On completion of authentication with the USB Smart Card, a signature of the Accessor Certificate is returned to the application.
5. The signature of the Accessor Certificate is sent to the TPM to authenticate the application.
6. The TPM verifies the signature of the Accessor Certificate from the USB Smart Card against all Accessor Certificates on the TPM.
7. If the signature doesn't verify, the user doesn't have a Normal Certificate stored on the TPM.
8. Otherwise authentication occurs and the user is presented with a list of Normal Certificates stored on the computer, one of which can be used to bank online.

Decryption/Signing Process
1. When an application needs a cryptographic service it first obtains a time-stamped transactionID from the cryptographic chip.
2. The application sends the time-stamped transactionID to the Smart Card or eKey where it is signed.
3. If this is the $1^{st}$ time the application has used the Smart Card, then the Smart Card will require the user to authorize the session by clicking "OK" or entering a password because silent-mode login has been disabled on the Smart Card. Also, only the PKCS #11 has been implemented on the Smart Card.
4. The application sends the time-stamped transactionID signature with the data to the cryptographic chip.
5. The cryptographic chip takes the time-stamped transactionID it produced earlier for the application and signs it with the cryptographic chip's certificate.
6. The cryptographic chip compares the two signatures. If they are equal the cryptographic service is performed.

Exporting the Accessor Certificate to the USB Smart Card Process
If the Accessor Certificate can be intercepted as it is being transferred from the TPM to the USB Smart Card the system is rendered useless. The Accessor Certificate can be safely exported to the USB Smart Card in the following way.
1. On instruction, the USB Smart Card issues a public key from a keypair generated temporarily for the purpose of importing an Accessor Certificate.
2. The application coordinating the transfer takes the public key from the USB Smart Card and sends it to the TPM.
3. The TPM encrypts the Accessor Certificate, which is currently being used, with the public key.
4. The encrypted Accessor Certificate is passed back from the TPM to the application, which sends it to the USB Smart Card.
5. The USB Smart Card decrypts the Accessor Certificate with the private key from the keypair generated temporarily for the purposes of importing the Accessor Certificate.

6. The USB Smart Card adds the decrypted Accessor Certificate to its list of certificates. Nowhere in this scenario was it possible to gain access to the keypair of Accessor Certificate.

Exporting a Normal Certificate to the USB Memory Stick Process

There will be times when a Normal Certificate is needed on a computer other than the one on which the certificate was created. An example would be a user normally did online banking at work but had a sudden need to do further work from home. The user, in this scenario, has created their online banking certificate on their work computer where it is stored. Now the user wants to export that certificate from their work computer and take it to their home computer where the user would import the certificate into the TPM of their home computer.

Many Accessor Certificates can be stored on the same USB Smart Card. It is entirely possible to store the Accessor Certificate for a user's work PC and home PC on the same USB Smart Card.

1. Use the USB Smart Card to authenticate to the work PC.
2. Once it is authenticated, select the online banking certificate from the list of Normal Certificates stored on the TPM of the work PC.
3. Choose to "Export" the certificate.
4. The certificate is encrypted with the public key of the Accessor Certificate for the home PC, which is stored on the USB Smart Card or another USB Smart Card.
5. The user is instructed to connect the USB Memory Stick and the encrypted certificate is written.
6. At home use the USB Smart Card to authenticate to the home PC.
7. Once authentication has occurred and the "Import a Certificate" feature has been selected, the user is asked to set the path to the encrypted online banking certificate on the USB Memory Stick.
8. Secondly the user is required to select the Accessor Certificate, used to encrypt the online banking certificate, from the USB Smart Card.
9. The online banking certificate is imported into the TPM of the home PC in encrypted form. Remember that the online banking certificate was encrypted by the Accessor certificate of the home PC and therefore can be decrypted by its copy residing on the TPM of the home PC.
10. The certificate is saved to the Normal Certificate list in the TPM of the home PC.

In other illustrative embodiments, the Smart Card or eKey communicates with a computer or data storage hardware using wireless communication, for example, using Bluetooth, microwave, infrared, satellite, or other type of wireless communication. With the use of such communication methods, it may be unsafe to send a copy of both a CryptoChip public and private keypair, from a CryptoChip on the computer to the eKey. Instead, the eKey generates a public/private keypair and only sends the public key to the CryptoChip on the computer. Further, instead of altering a PKCS #11 library to switch off silent-mode login, as in previous embodiments, the eKey provides its own cryptographic library. This is performed because it may be difficult to guarantee a session's veracity while using wireless transmission methods. Rather, veracity is guaranteed through the use of a user interaction, for example, the use of a fingerprint reader. Thus, the use of the Smart Card or eKey is the first factor of authentication while the user interaction, for example, the use of a fingerprint reader, provides the second factor.

With the eKey generating the public/private keypair and sending the public key to the CryptoChip, each distinct account on the CryptoChip, for example, corresponding to a Certificate and individualized Distinguished Name details, has its own distinct public key and the associated private key, to each account, is stored on the eKey. By sending the public key from the eKey to the CryptoChip, the eKey is able to produce a signature, with the private key of the eKey, which will be 'verified' by the public key previously sent to the CryptoChip.

An illustrative embodiment of the disclosure is described with reference to the process of FIG. 8. In this embodiment, a Smart Card or eKey 800 generates both a public and private keypair. The public key 814 is sent to a computer 806 via a wireless communication 808 and is stored within an account on a CryptoChip 804 on the computer that corresponds with the user of the eKey 800. Such wireless communication 808 may include Bluetooth, microwave, infrared, satellite, and other types of wireless communication. The private key 812 is stored on a CryptoChip 802 within the eKey 800 that corresponds with the computer 806 being used. The CryptoChip 804 on the computer 806 works if the instruction to do so is accompanied by a signature created by the private key 812 stored on the CryptoChip 802 located within the eKey 800 and if the correct user interaction occurs, for example, if a correct fingerprint is applied to a fingerprint analyser 810 located on the eKey 800. The fingerprint applied to the fingerprint analyser 810 is verified by the public key 814 stored on the CryptoChip 804 on the computer 806.

When an application needs a cryptographic service it first obtains a transactionID from the CryptoChip on the computer. The application then sends the transactionID to the eKey where it is signed. If this is the first time the application has used the eKey, then the eKey requires the user to authorize the session, by performing a user interaction, for example, by inputting a fingerprint into a fingerprint reader. The application then sends the transactionID signature with the data to the CryptoChip. The CryptoChip takes the transactionID signature and verifies it with the public key previously received from the eKey. If the CryptoChip verifies the signature the cryptographic service is performed. Otherwise the cryptographic service is not performed.

Logging-On with the eKey

Figure 8:
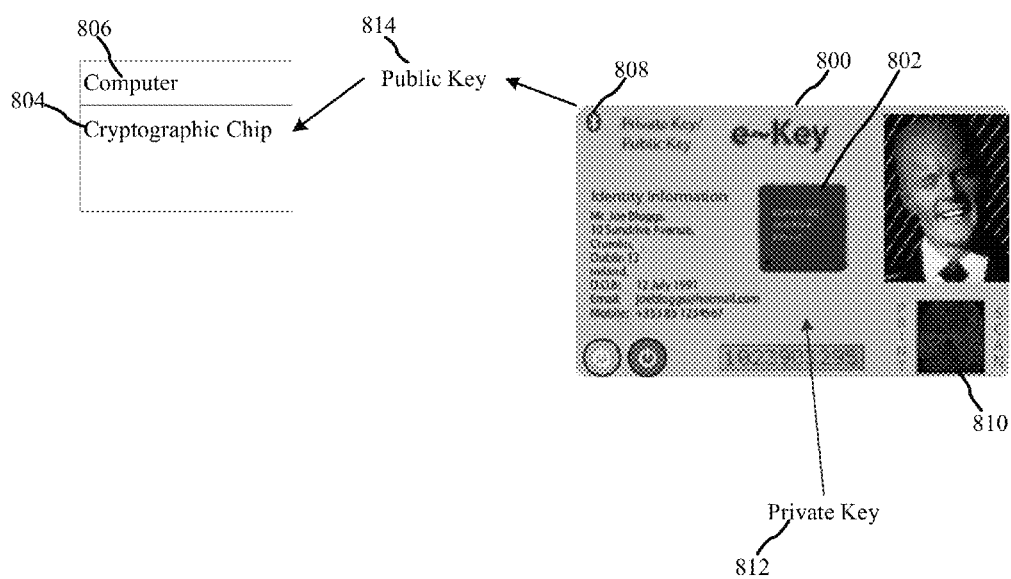
FIG. 8 is a system diagram of an authentication system and process according to an illustrative embodiment of the disclosure.
Figure 9:
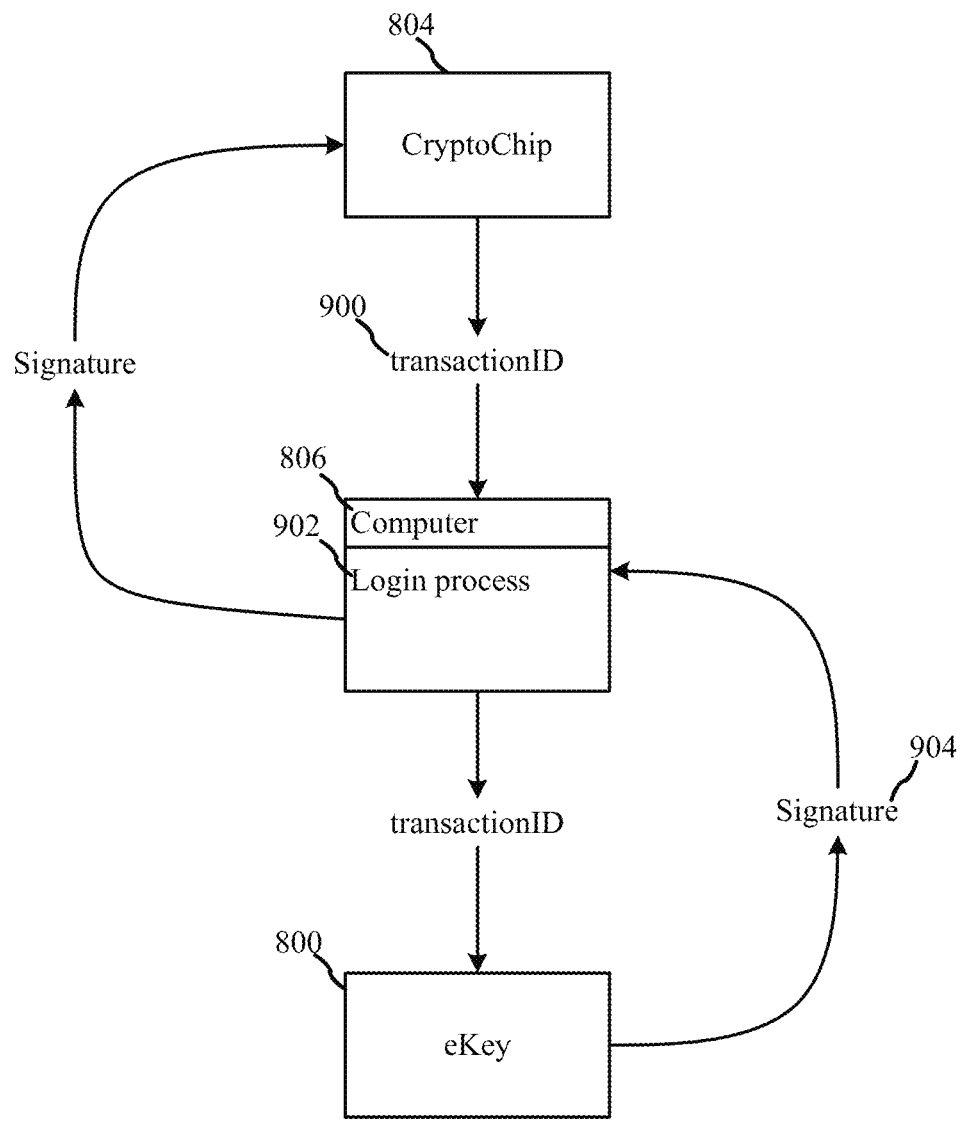
FIG. 9 is a block flow diagram of a process of the authentication system of FIG. 8 according to an illustrative embodiment of the disclosure.

Referring to FIGS. 8 and 9, a process of logging-on is described. With the private key 812 stored on a CryptoChip 802 of the eKey 800 (also referred to as a guardian private key) and with the public key 814 stored on the CryptoChip 804 of the computer 806 (also referred to as a guardian public key), logging-on to the computer 806 is as follows:

1. The login process 902 requests a transactionID 900 from the CryptoChip 804 of the computer 806. The transactionID 900 may be a random number generated by the CryptoChip 804.
2. The login process 902 sends the transactionID 900 to the eKey 800, via the wireless communication 808, to be signed.
3. The eKey 800 awaits a user interaction, for example, a swipe of the fingerprint analyser 810, before it signs the transactionID 900 with the guardian private key 812, which is stored on the CryptoChip 802 of the eKey 800.
4. The signed transactionID or signature 904, is returned via the wireless communication 808 to the login process 902 on the computer 806.

5. The login process 902 sends the signature 904 to the CryptoChip 804 on the computer 806.
6. The CryptoChip 804 on the computer 806 attempts to verify the signature 904 with the guardian public key 814. If the signature 904 verifies, the user is allowed to login to the computer 806.

The above provides a secure means of login (a session with a single request/response transaction) but when a session is needed which stays alive across multiple transactions, like encryption/decryption, a second signature is needed. The first signature being the guardian signature and guarding cryptographic keys on the CryptoChip. The second signature may be an application signature. The application signature ties the application, for example, a word processing application, or other application, to the eKey and ensures that the eKey cannot be harnessed by another application or malware to decrypt data. Any compliant computer application can be tied to the eKey if the application can generate an application public/private keypair, store the application private key in its memory, and send the application public key to the eKey.

The application signature precludes the guardian signature from being hijacked by a hacker/virus because a user interaction must be performed, for example, the fingerprint must be swiped, and a hacker/virus cannot provide such interaction. To authenticate an application, for example, a word processing application, the eKey generates a random number RN which is displayed in the VDU. The RN is encrypted by the eKey with an application public key and sent wirelessly to the application being used. The application decrypts the RN with an application private key and displays the RN. The user visually compares the decrypted RN, in the application, to the RN displayed on the VDU, and if they are equivalent the user swipes the fingerprint reader.

An illustrative embodiment of the disclosure is described with reference to the process of FIG. 10. In this embodiment, an eKey 1000 generates both a public and private keypair known as the guardian key pair. The guardian public key 1022 is sent to a computer 1020 via a wireless communication 1024 and is stored within an account on a CryptoChip 1018 on the computer 1020 that corresponds with the owner of the eKey 1000. Like that of the previous embodiment, such wireless communication 1024 may include Bluetooth, microwave, infrared, satellite, and other types of wireless communications. The guardian private key 1006 is stored on a CryptoChip 1002 within the eKey 1000 that corresponds with the computer 1020 being used. An application 1016 generates an application keypair, comprising an application public key 1010 and an application private key 1014, and sends the application public key 1010 to the eKey 1000 while the application private key 1014 is stored in the application's memory space 1012. Upon receiving the application public key 1010, the eKey 1000 generates a Random Number (RN) that the eKey 1000 displays as digits in an eKey VDU 1008. The eKey 1000 in turn encrypts the RN with the application public key 1010 and returns the encrypted RN to the application 1016. Upon receiving the encrypted RN, the application 1016 attempts to decrypt the RN with the application private key 1014. If the decrypted RN is equivalent to the RN displayed in the eKey VDU 1008, the application 1016 authenticates and the user swipes a fingerprint reader 1004 to start the secure session.

Decrypting Data with the eKey

Figure 10:
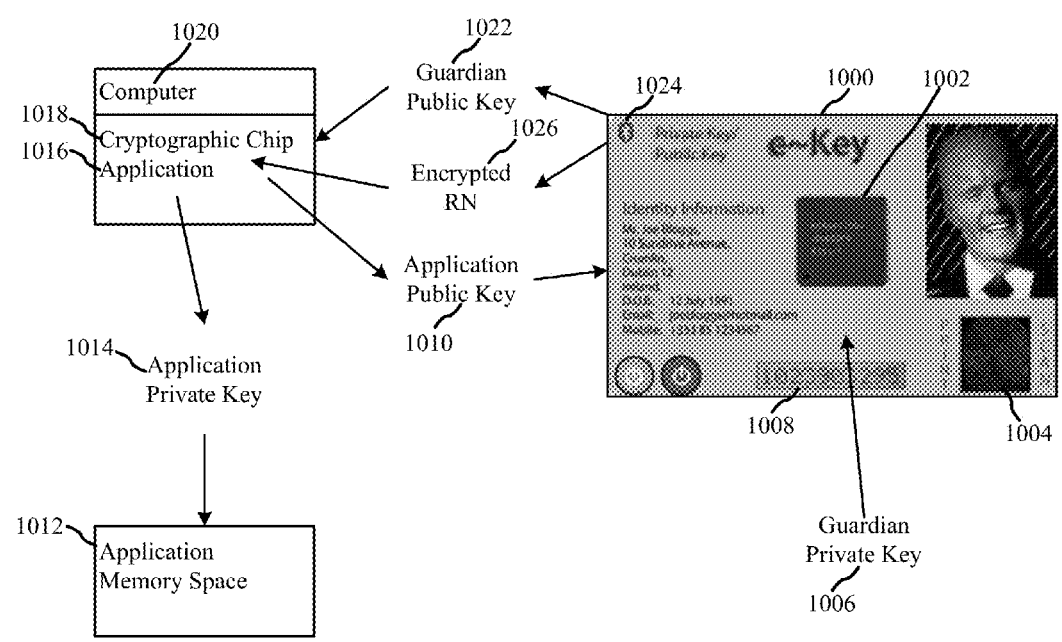
FIG. 10 is a system diagram of an authentication system and process according to an illustrative embodiment of the disclosure.
Figure 11:
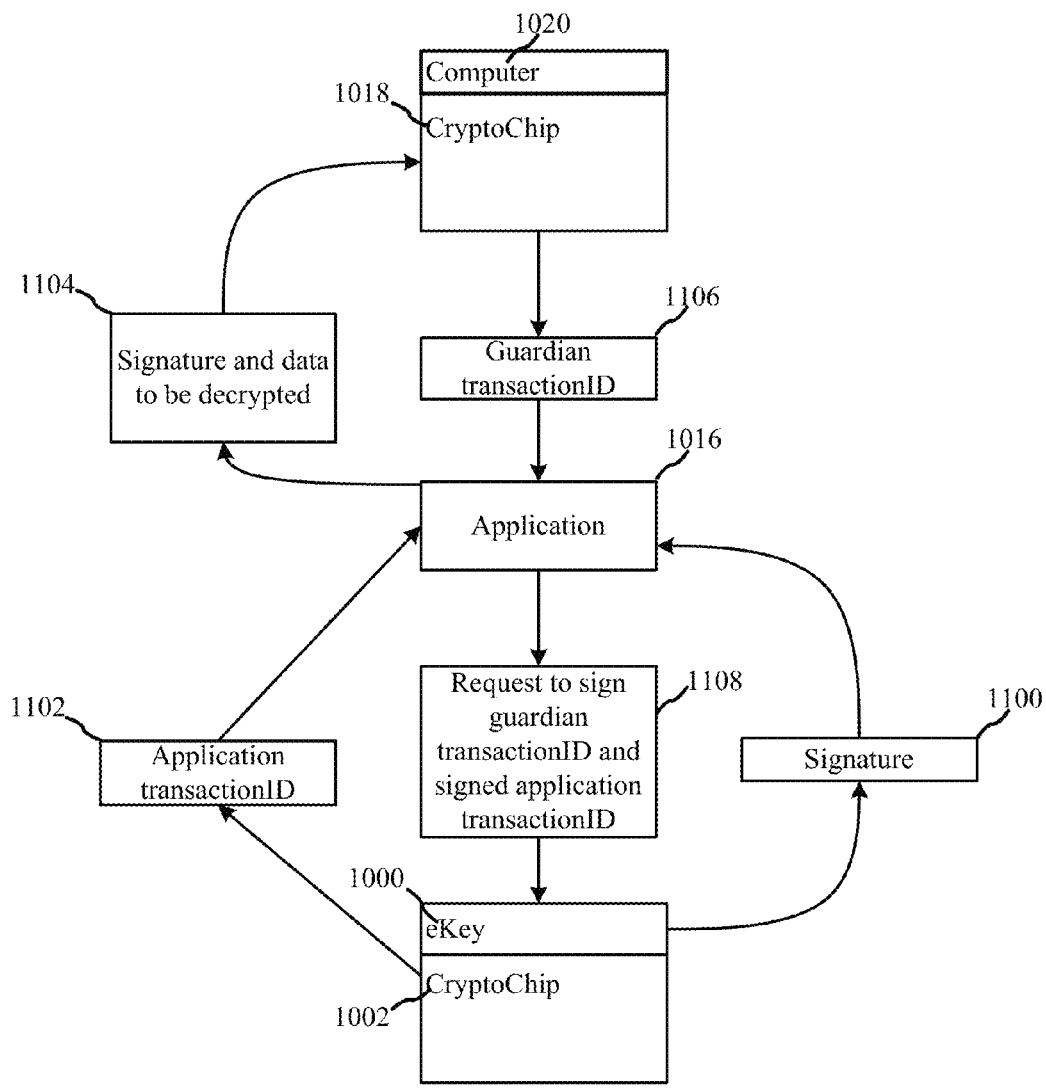
FIG. 11 is a block flow diagram of a process of the authentication system of FIG. 10 according to an illustrative embodiment of the disclosure.

Referring to FIGS. 10 and 11 a process of initiating the cryptographic chip to decrypt data is described.
1. The application 1016 first requests a guardian transactionID 1106 from the CryptoChip 1018 on the computer 1020.
2. Second, the application 1016 requests, via the wireless communication 1024, an application transactionID 1102 from the CryptoChip 1002 on the eKey 1000.
3. The application 1016 signs the application transactionID 1102 with the application private key 1014 stored in the computer application's memory space 1012.
4. The application 1016 packages the request for the eKey 1000 to sign the guardian transactionID 1106 with the signed application transactionID 1102, illustrated as 1108, and sends both to the eKey 1000, via the wireless communication 1024.
5. The eKey 1000 verifies the application transactionID signature with the application public key 1010, stored on the eKey's CryptoChip 1002. If the signature verifies, the eKey 1000 signs the guardian transctionID 1106 with the guardian private key 1006 and the signature 1100 is returned to the application 1016, via the wireless communication 1024.
6. The application 1016 packages the guardian transactionID signature with the data it wants decrypted, illustrated as 1104, and sends both to the CryptoChip 1018 on the computer 1020.
7. The CryptoChip 1018 verifies the guardian transactionID signature with the guardian public key 1022 stored on the user's account on the CryptoChip 1018.
8. If the guardian transactionID signature verifies, the CryptChip 1018 decrypts the encrypted data with one of the certificates in the user's account.

Online Security with the eKey

Figure 12:
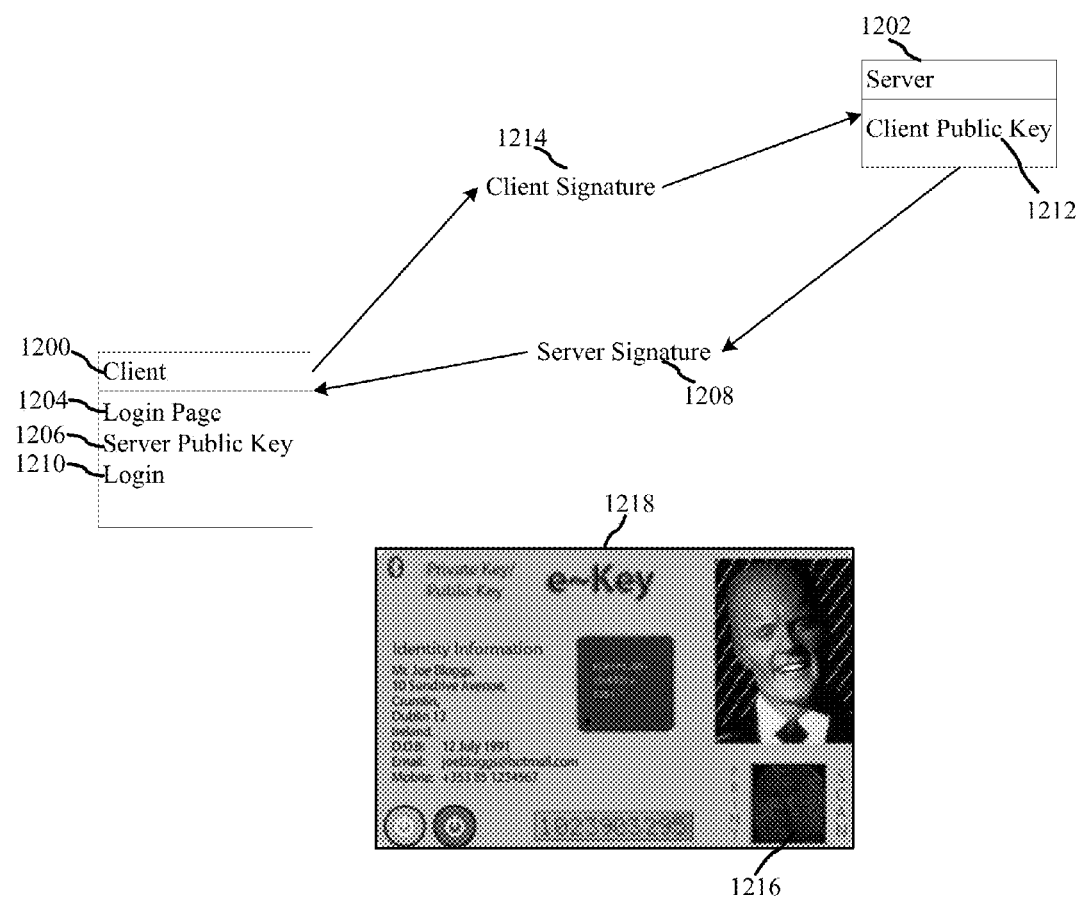
FIG. 12 is a block diagram of an authentication system and process according to an illustrative embodiment of the disclosure.

Referring to FIG. 12 a process for securely using an eKey online is described. A signature is used to secure online communications by tying a client 1200, for example, a client computer, to a server 1202, for example, corresponding to an online banking institution or other third party, and by tying the server 1202 to the client 1200, in a double tie—the online tie. When the client 1200 downloads a login page 1204, for example, a webpage downloaded via a network such as the internet, the login page 1204 contains a server public key 1206. All subsequent communications, downloaded from the server 1202 to the client 1200, include a server signature 1208 which will be verified by the server public key 1206. Only the server 1202 may have the ability to produce this signature.

For example, when a user of the client 1200 activates or clicks a Login button 1210 in the login page 1204, a client public key 1212 is uploaded to the server 1202. All subsequent communications, uploaded from the client 1200 to the server 1202, include a client signature 1214 which will be verified by the client public key 1212. Only the client 1200 may be able to produce this signature.

It is difficult, if not impossible, for a hacker/virus to begin the aforementioned online communication because, when the server public key 1208 is initially downloaded at login the user may need to perform a user interaction, for example, by swiping a fingerprint reader 1216 on the eKey 1218.

Exporting a Normal Certificate to the eKey Process

There will be times when a Normal Certificate is needed on a computer other than the one on which the certificate was created. An example would be a user normally did online banking at work but had a sudden need to do further work from home. The user, in this scenario, has created their online banking certificate on their work computer where it is stored. Now the user wants to export that certificate from their work computer and take it to their home computer where the user would import the certificate into the CryproChip of their home computer.

Many Accessor Certificates can be stored on the same eKey. It is entirely possible to store the Accessor Certificate for a user's work PC and home PC on the same eKey.

1. Use the eKey to authenticate to the work PC.
2. Once it is authenticated, select the online banking, or other remote computer, certificate from the list of Normal Certificates stored on the CryptoChip of the work PC.
3. Choose to "Export" the certificate.
4. The certificate is encrypted with the public key of the Accessor Certificate for the home PC, which is stored on the eKey or another eKey.
5. The user is instructed to connect the USB Memory Stick and the encrypted certificate is written.
6. At the remote computer, e.g. home, use the eKey to authenticate to the home PC.
7. Once authentication has occurred and the "Import a Certificate" feature has been selected, the user is asked to set the path to the encrypted online banking certificate on the USB Memory Stick.
8. Secondly the user is required to select the Accessor Certificate, used to encrypt the online banking certificate, from the eKey.
9. The online banking certificate is imported into the CryptoChip of the home PC in encrypted form. Remember that the online banking certificate was encrypted by the Accessor certificate of the home PC and therefore can be decrypted by its copy residing on the CryptoChip of the home PC.
10. The certificate is saved to the Normal Certificate list in the CryptoChip of the home PC.

A properly working PKI system depends on a user's private key remaining private. While Smart Cards/eKey make it impossible to steal a user's private key, the weakness of a cryptographic chip performing a cryptographic task as long as it passes the correct password means that while it may not be possible to steal a private key it is possible to utilize a private key, thus undermining confidence in such a system.

Further, the embodiments described with reference to FIGS. 1-7 may be modified in accordance with the systems and methods described with reference to FIGS. 8-11 to allow the Smart Cards/USB to communicate wirelessly.

Embodiments of the present disclosure may be performed by software or software and include hardware apparatus such as various microprocessor based devices, networks, general purpose computers and the like, such as persons having ordinary skill in the art would recognize for use in implementing the embodiments as described herein.

Although the present disclosure is described herein generally with reference to Smart Cards and eKeys, also known as universal locks, persons having ordinary skill in the art should appreciate that the various embodiments of the invention are directed to cryptographic hardware, generally and are not limited particularly to Smart Cards or any specific type of cryptographic hardware. For example, various embodiments may include login, encryption, online activities, doors, cars, homes, offices, building spaces, points of sale, automatic telling machines, smart phones, pacemakers, car management systems, radio frequency identification chips, and other similar mediums that use secure transmissions.

While the disclosure has been described with reference to illustrative embodiments, it will be understood by those skilled in the art that various other changes, omissions, and/or additions may be made and substantial equivalents may be substituted for elements thereof without departing from the spirit and scope of the disclosure. In addition, many modifications may be made to adapt a particular situation or material to the teaching of the disclosure without departing from the scope thereof. Therefore, it is intended that the disclosure not be limited to the particular embodiments disclosed, but that the disclosure will include all embodiments, falling within the scope of the appended claims. Moreover, unless specifically stated any use of the terms first, second, etc., do not denote any order of importance, but rather the terms first, second, etc. are used to distinguish one element from another.

What is claimed is:

1. A method of securely decrypting data, comprising:
   obtaining, by a computer application, a first transactionID from a cryptographic chip of a computer;
   obtaining, by the computer application, a second transactionID from a wireless eKey;
   signing, by the computer application, the second transactionID with a second private key stored on the computer;
   sending, by the computer application, the first transactionID and the signed second transactionID to the eKey for verifying the signed second transactionID with a second public key stored on the eKey;
   receiving, by the computer application, in response to the verification, a signed first transactionID from the eKey, the signed first transactionID being signed with a first private key stored on the eKey; and
   sending, by the computer application, the signed first transactionID with data to the cryptographic chip of the computer, the cryptographic chip verifying the signed first transactionID with a first public key stored on the cryptographic chip, the cryptographic chip decrypting the data in response to verifying the signed first transactionID.

2. The method of claim 1, further comprising receiving a first keypair including the first public key and the first private key from the eKey.

3. The method of claim 2, further comprising receiving from the eKey, the first public key to the computer and the public key being stored on the cryptographic chip.

4. The method of claim 1, further comprising generating a second keypair including the second public key and the second private key.

5. The method of claim 4, further comprising sending the second public key to the eKey and the second public key being stored on the eKey.

6. The method of claim 5, further comprising generating, by the eKey, a random number and displaying the random number on a display of the eKey.

7. The method of claim 6, further comprising encrypting, by the eKey, the random number with the second public key.

8. The method of claim 7, further comprising receiving the encrypted random number from the eKey.

9. The method of claim 8, further comprising decrypting the encrypted random number with the second private key.

10. The method of claim 1, wherein the eKey uses a communication type selected from the group consisting of Bluetooth, microwave, infrared, and satellite.

* * * * *